Nov. 11, 1969   H. I. HAZZARD   3,477,555
CENTRIFUGAL FRICTION CLUTCH
Filed Jan. 30, 1968   3 Sheets-Sheet 1
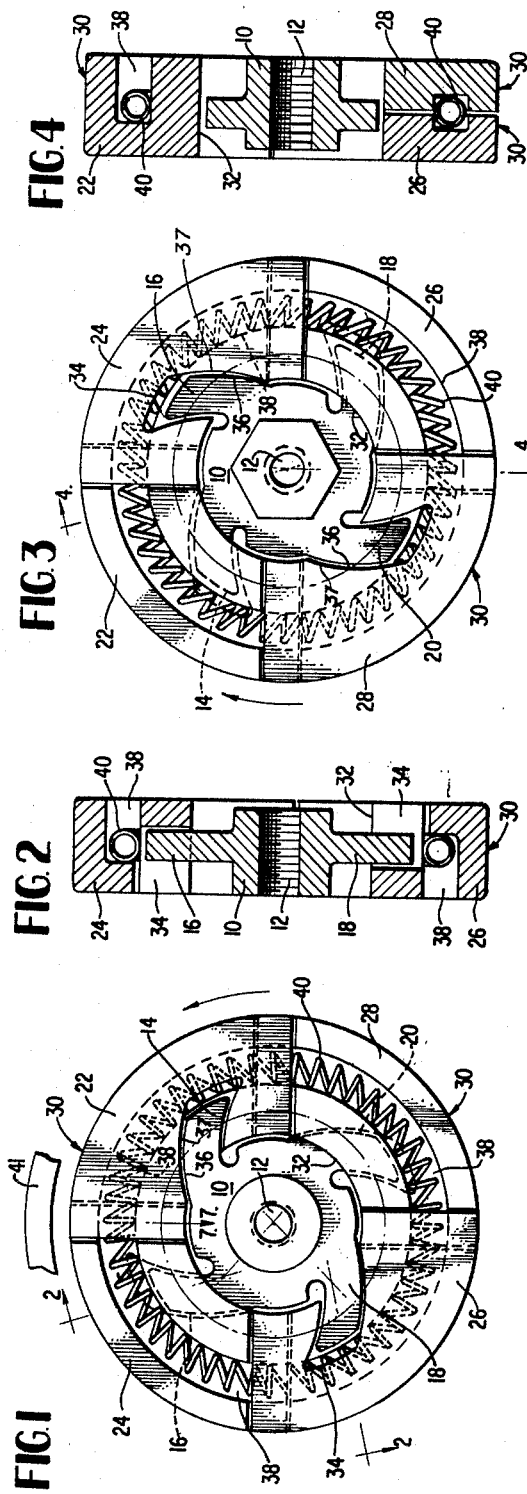
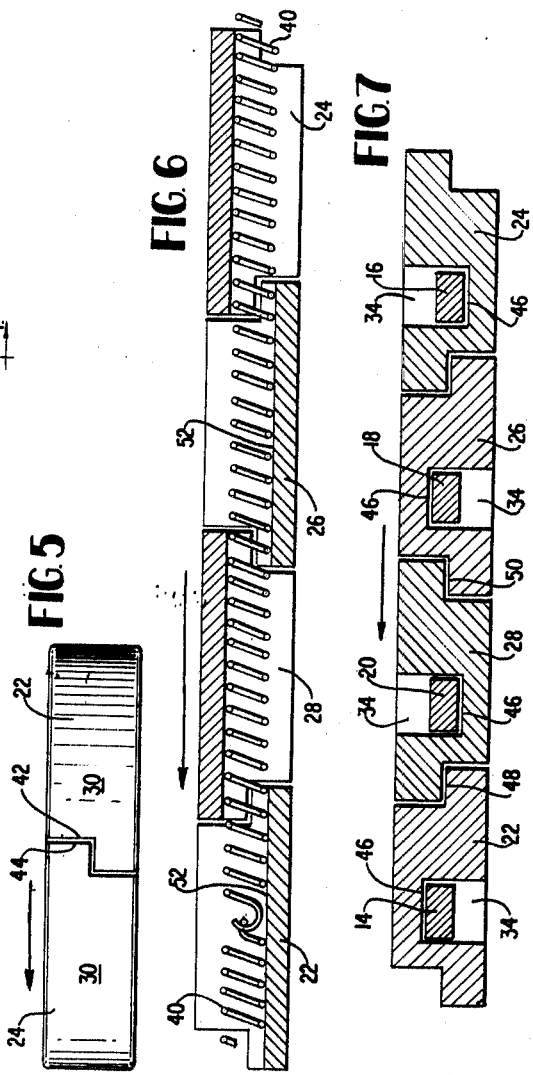
INVENTOR.
HARRY I. HAZZARD
BY
ATTORNEYS Nov. 11, 1969  H. I. HAZZARD  3,477,555
CENTRIFUGAL FRICTION CLUTCH
Filed Jan. 30, 1968  3 Sheets-Sheet 2

INVENTOR
HARRY I. HAZZARD

BY

ATTORNEYS

Nov. 11, 1969
H. I. HAZZARD
3,477,555
CENTRIFUGAL FRICTION CLUTCH
Filed Jan. 30, 1968
3 Sheets-Sheet 3
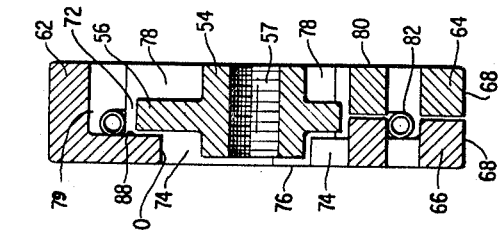
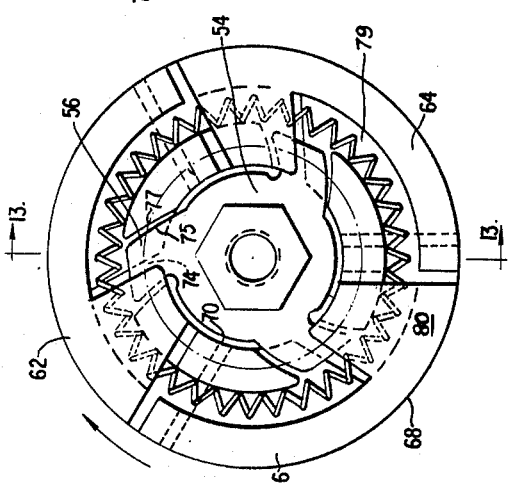
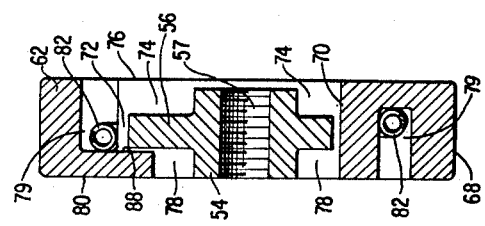
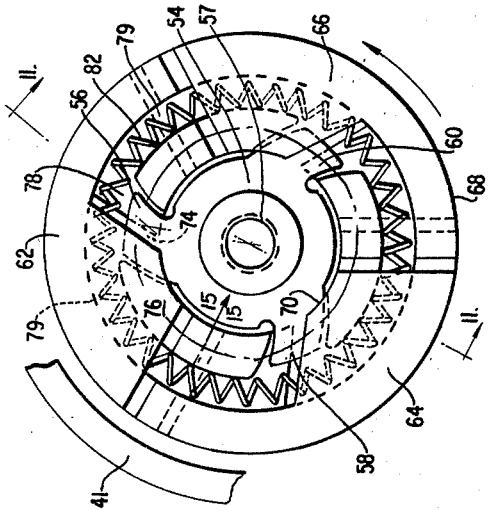
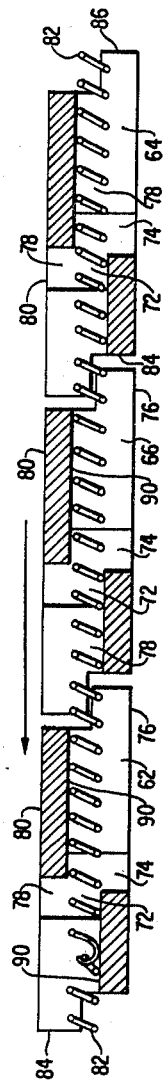
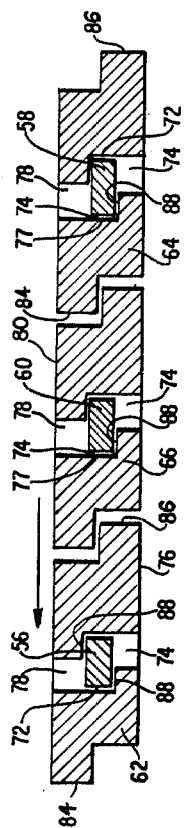
INVENTOR.
HARRY I. HAZZARD
BY
Burns, Doane, Benedict, Swecker & Mathis
ATTORNEYS

United States Patent Office 3,477,555
Patented Nov. 11, 1969

3,477,555
CENTRIFUGAL FRICTION CLUTCH
Harry I. Hazzard, Los Angeles, Calif., assignor to McCulloch Corporation, Los Angeles, Calif., a corporation of Wisconsin
Filed Jan. 30, 1968, Ser. No. 708,470
Int. Cl. F16d 23/10, 13/72; B60t 1/00
U.S. Cl. 192—105                                   15 Claims

ABSTRACT OF THE DISCLOSURE

A centrifugally actuated friction clutch having a plurality of sectorial clutch shoes held radially inward by an encompassing coil spring and a hub having a plurality of guide arms extending outwardly into slots in the clutch shoes, the improvement residing in the self-retention of the elements of the clutch by the structure of the clutch shoes and the radially inwardly biasing coil spring. The outwardly extending guide arms of the hub, the spring receiving groove of the clutch shoes, and the overlapping edges of the clutch shoes provide the axial restraint. Alternative embodiments include the alternating of symmetrically opposed, but otherwise identical, clutch shoes and completely identical clutch shoes. Construction of the clutch shoes encourages the cooling flow of air through the clutch.

Background of the invention

Centrifugally actuated friction clutches are well known in the art. In general, such clutches comprise a hub having a plurality of radially outwardly extending guide arms and a plurality of sectorial clutch shoes slotted to receive the arms of the hub. The shoes have a friction surface on the outer periphery for pressural engagement of an overlying drum under the action of centrifugal force. The clutch shoes are conventionally slotted inwardly from the outer periphery or axially from one of the flat sides to receive a coil spring which serves to bias the shoes radially inward out of engagement with the overlying drum.

Centrifugally actuated clutches have particular utility in devices wherein a small gasoline engine is employed to drive a tool member such as a portable chain saw, drill, or the like. In these and other applications it is desirable that the torque applied to the tool member be controlled solely by the speed of the engine, no torque being applied while the engine is idling yet substantially full torque being applied immediately upon the increasing of the speed of the engine.

As the shaft of the driving engine increases in speed, the centrifugal force acting on the sectorial clutch shoes increases and tends to move the shoes outwardly against the tension of the coil spring and into a pressural engagement with the clutch drum thereby imparting rotation to the tool member. The disengagement of the clutch also occurs automatically in the reverse manner upon a reduction in engine speed sufficiently for the tension in the spring to overcome the centrifugal force generated.

In prior art friction clutches, it has been necessary to provide some means for preventing the axial separation of the elements which comprise the clutch. The means conventionally used to retain the clutch elements assembled is one or more guide plates located axially in front of and behind the sectorial clutch shoes. The necessity for using axial restraining means has increased the number of elements of the clutch resulting in higher manufacturing cost, increased parts inventory, greater complexity and difficulty in assembly and repair, and greater susceptibility to structural failure etc. due to mechanical wear.

It is accordingly an object of the present invention to remedy the deficiencies of the prior art and to provide a novel method and apparatus for axially restraining the elements of a centrifugally actuated friction clutch by the construction of the clutch shoes and the radially inwardly biasing coil spring.

Another object of the present invention is to provide a novel centrifugally actuated friction clutch which is durable, simple in construction, and which utilizes a reduced number of component parts.

Still another object of the present invention is to provide a novel centrifugally actuated friction clutch in which the need for axially retaining guide plates has been obviated by the design of the clutch shoes, the shoes being axially restrained between the radially inwardly biasing means on the one side and the outwardly extending arms of the hub on the other side.

A further object of the present invention is to provide a novel centrifugally actuated clutch in which axial restraint is provided by the overlapping edges of the clutch shoes and the outwardly extending guide arms of the hub.

A still further object of the present invention is to provide a novel centrifugally actuated clutch in which the elements are axially restrained by the resilient centrifugal force opposing means and the overlapping edges of the sectorial clutch shoes.

Yet another object of the present invention is to provide a novel clutch shoe configuration which encourages the cooling flow of air through the clutch.

These and other objects and advantages will become apparent from a consideration of the claims and from the following description when read in conjunction with the appended drawings.

The drawings

FIGURE 1 is a front face view of a clutch having an even number of clutch shoes;

FIGURE 2 is a section taken through lines 2—2 of FIGURE 1;

FIGURE 3 is a rear face view of the clutch of FIGURE 1;

FIGURE 4 is a section taken through lines 4—4 of FIGURE 3;

FIGURE 5 is a top view of the clutch of FIGURE 1;

FIGURE 6 is a circular section taken at the axis of the spring of the clutch of FIGURE 1 looking radially inward;

FIGURE 7 is a circular section taken at the radius 7—7 of FIGURE 1 looking radially inward;

FIGURE 10 is a front face view of a second embodiment of the clutch of the present invention which may be adapted for either an even or an odd number of clutch shoes;

FIGURE 11 is a section taken through lines 11—11 of FIGURE 10;

FIGURE 12 is a rear face of the clutch of FIGURE 10;

FIGURE 13 is a section taken through lines 13—13 of FIGURE 12;

FIGURE 14 is a circular section taken at the axis of the spring of FIGURE 10 looking radially inward;

FIGURE 15 is a circular section taken at the radius 15—15 of the clutch of FIGURE 10 looking radially inward;

The preferred embodiment

Figure 8:
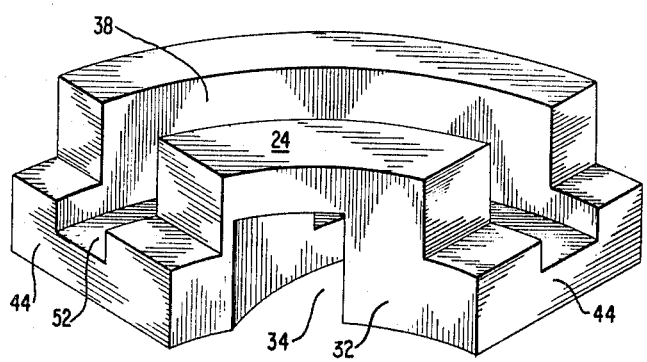
FIGURE 8 is a perspective view of one of the sectorial shoes of FIGURE 1 looking radially outward from the forward face thereof.

Referring to FIGURES 1 through 9 of sheets 1 and 2 of the drawings, a hub 10 is affixed in any conventional manner to driving shaft 12 for rotation therewith. Hub 10 has, in the embodiment illustrated, four equally spaced, outwardly extending, somewhat arcuate, guide arms 14, 16, 18 and 20.

Mounted about the hub 10 are sectorial brake shoes 22, 24, 26 and 28, respectively. Alternate ones of the shoes 22–28 are identical and interchangeable, adjacent ones of the shoes differing only in the angles of the guide slots 34. Each of the shoes has an outer circumference 30 surfaced with or characterized by a frictional material for pressural engagement with the internal surface of a cylindrical drum 41, fragmentarily shown. The drum 41 coaxially surrounds the assembled clutch and is affixed to the driven shaft (not shown) for rotation therewith.

The inner circumference 32 of each of the shoes 22–28 is coaxial with the hub 10. A somewhat arcuate guide slot 34 is cut into one face of each of the shoes 22–28 from the inner circumference 32 outwardly to a point approximately half-way between the inner circumference 32 and the outer circumference 30 of the shoes. Guide slots 34 are slightly larger dimensionally than the guide arms 14–20 so that one of the arms 14–20 may be loosely received therein. The configuration of the slots 34 and the arms 14–20 is conventional and is such that the engagement of the leading edge 36 of the guide arms 14–20 with the leading surface 37 of the slots 34 of the sectorial shoes 22–28 upon the driving of shaft 12 will force the shoes 22–28 outwardly under the influence of centrifugal force from their clustered position about the hub 10.

In the illustrated embodiment where the axial thickness of the guide arms 14–20 is approximately one-third of the axial thickness of the shoes 22–28, the axial depth of the guide slots 34 is approximately two-thirds of the thickness of the shoes 22–28. These proportions may, of course, be modified. It is desirable but not necessary to the practicing of the present invention that the guide arms 14–18 be axially centered with respect to the shoes 22–28.

Each of the shoes 22–28 has an arcuate groove 38 partially encircling the hub 10 and cut into the face of each of the shoes opposite to that face into which the guide slots 34 have been cut. The grooves 38 of each of the shoes are coaxial with the axis of shaft 12 at a common distance therefrom and may communicate with the radially outer ends of the slots 34. The grooves 38 may be cut to an axial depth sufficient for a resilient coil spring 40 to be disposed under tension therein, substantially coplanar with the guide arms 12–18.

The coil spring 40 serves as the means for biasing the sectorial shoes 22–28 inwardly in a cluster about the hub 10 and out of frictional pressural engagement with the overlying cylindrical drum 41 in the absence of the driving rotation of shaft 12.

Figure 9:
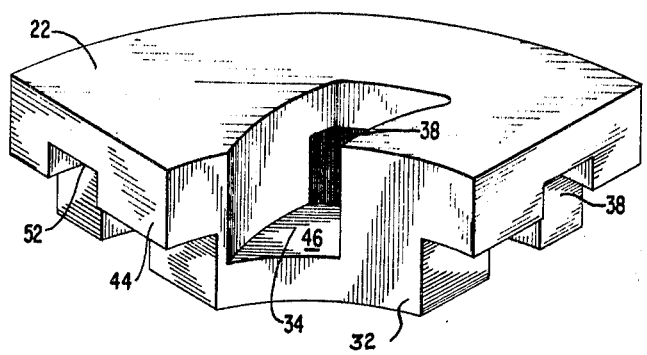
FIGURE 9 is a perspective view of an adjacent one of the sectorial shoes of FIGURE 1 looking radially outward from the forward face thereof.
Figure 16:
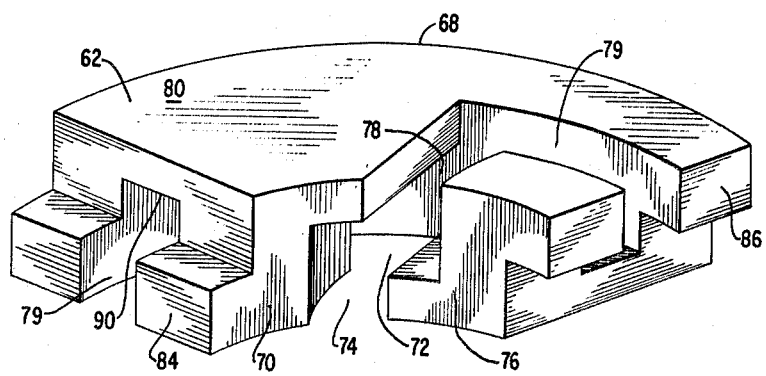
FIGURE 16 is a perspective view of the clutch shoes of FIGURE 10 looking radially outward from the front face thereof.

The leading and trailing edges of each of the shoes 22–28 have an axial variation in thickness as may be seen in FIGURES 8 and 9 but more clearly in FIGURE 5 wherein the leading edge 42 of shoe 22 overlies the trailing edge of shoe 24 at the front face thereof. This overlying relationship, of course, also exists as viewed from the rear, with edge 44 of shoe 24 overlapping edge 42 of shoe 22. The overlapping faces of both the leading and the trailing edge is the face into which the guide slots 34 are cut, e.g. the forward face of shoes 22 and 28 and the rearward face of shoes 22 and 28. The illustrated embodiment is thus restricted to an even number of sectorial shoes.

As may be seen from the figures, adjacent ones of the shoes 22–28 are oppositely oriented so that the spring 40 receiving groove 38 opens alternatively into the forward and rearward faces of the clutch shoes over the entire length of the groove as well as through the radially outer extremities of the guide slots 34.

As may be more clearly seen from FIGURE 7, axial restraint of each of the individual clutch shoes is provided in one direction by the abutment of the guide arms 14–20 with the bottom surface 46 of the guide slots 34. Each of the shoes 22–28 is axially restrained in the other direction by the overlapping edges of the adjacent shoes. For example, shoe 28 is axially restrained between guide arm 20 and the respective overlapping edges 48 and 50 of shoes 22 and 26.

As may be seen in FIGURE 6, additional axial restraint of each of the clutch shoes is provided by spring 40. Any tendency of shoe 28 to move towards the face of the shoes into which the groove 38 is cut is opposed by the resiliency of spring 40 as restrained by abutment of the bottom surfaces 52 of the adjacent shoes 22 and 26.

By means of the foregoing described construction and interfitting relationships, the individual elements of the clutch are securely restrained from axial movement. The need for additional restraining elements is eliminated, the number of component parts and clutch size are reduced, and assembly and maintenance is facilitated by the interchangeability of the shoes.

An alternative embodiment

An alternative in the embodiment shown in FIGURES 1–9 is the embodiment illustrated in FIGURES 10–16 of sheets 2 and 3 of the drawings.

Referring to sheet 3 of the drawings, a hub 54 is affixed in a conventional manner to shaft 57 for rotation therewith. In this embodiment, hub 54 has three equally spaced, outwardly extending, generally arcuate, guide arms 56, 58 and 60.

Clustered about the hub 54 are sectorial brake shoes 62, 64 and 66. Each of the shoes 62–66 is identical to and interchangeable with each of the other shoes. The outer circumference 68 of each of the shoes 62–66 is surfaced with or characterized by a frictional material for pressural engagement with the coaxially surrounding internal surface of a cylindrical clutch drum 41 fragmentarily shown in FIGURE 10.

The inner circumference 70 of each of the shoes 62–66 is coaxial with the hub 54. Each of the shoes 62–66 has a guide slot 72 cut outwardly from the inner circumference 70 to a point approximately half-way between the inner circumference 70 and the outer circumference 68 of the shoes. The guide slots 72 are formed by cutting generally arcuate slots 74 into the front face 76 of each of the shoes 62–66 and by cutting generally arcuate slots 78 into the rear face 80 of each of the shoes 62–66. As best seen in FIGURES 14 and 15, the slots 74 and 78 are contiguous and overlap in depth by approximately one-third of the thickness of the shoes. These slots are circumferentially offset with respect to each other to define the guide arm receiving slots 72.

The guide slots 72 are slightly larger dimensionally than the guide arms 56–60 of the hub 54 and are configured to substantially conform to the shape thereof. The configuration is conventional in that engagement of the leading surface 75 of each of the guide arms 56–60 with the leading surface 77 of the guide slots 72 will cause the shoes 62–66 to move outwardly from their clustered position about the hub 54 into pressural and driving contact with the cylindrical drum 41.

Each of the shoes 62–66 has an arcuate groove 79 partially encircling the hub 54, the grooves 79 being cut into the forward face 76 over the trailing portion of each of the shoes and into the rearward face 80 over the leading portion of each of the shoes. The grooves 79 are coaxial with the shaft 56 at a common radius and are cut to a depth approximately two-thirds the axial thickness of the shoes 62–66. The leading and trailing portions of each of the shoes 62–66 into which the grooves 79 are cut overlap slightly so that the grooves 79 are contiguous and define a continuous groove in the assembled shoes 62–66 coaxial with the shaft 56.

A coil spring 82 is disposed within the grooves 79 desirably in substantially the same axial plane as that occupied by the guide arms 56–60 of the hub 54.

The leading edges 84 and the trailing edges 86 of each of the shoes 62–66 have an axial variation in thickness similar to that illustrated in FIGURE 5 with respect to the embodiment earlier described. The axial variation in thickness of the present embodiment presently described differs, however, in that the leading edge 84 of each of the shoes 62–66 is overlapped on the forward face 76 thereof by the trailing edge 86 of the immediately adjacent one of the shoes 62–66.

As may be more clearly seen from FIGURE 15, restraint against pure axial movement of each of the individual clutch shoes 62–66 with respect to the guide arms 56–60 of hub 54 is provided by the engagement of the bottom walls 88 of the guide slots 74 and 78 with the respective axially forward and rearward faces of the guide arms 56–60.

The axial restraint provided by the arms 56–60 of the hub 54 will not alone prevent separation of the elements of the clutch. The arms 56–60 will, however, provide restraint against rotation of the shoes about a radial axis coincident with that of the guide arms 55–60 in a clockwise direction as seen looking radially inward in FIGURE 15. Rotation of each of the shoes 62–66 counterclockwise about the same axis is prevented by the overlapping relationship of the edges 84 and 86 of the immediately adjacent ones of the shoes.

A further axial restraint is provided at the radius of the coil spring 82, it being apparent in FIGURE 14 that the coil spring 82 tends to oppose axial movement of each of the shoes 62–66 independently of the remaining shoes. Spring 82 also provides restraint against clockwise rotation of each of the shoes 62–66 about a radial axis looking inwardly by virtue of its resiliency and its abutment with the bottom surfaces 90 of the grooves 79.

In summary, each of the sectorial brake shoes is identical to and interchangeable with each of the remaining shoes. The number of shoes is a design choice largely determined by the size of the clutch. Axial restraint of each of the shoes is provided by the hub arms and the coil spring. Restraint against rotation about the respective guide arms is opposed in one direction by the coil spring and by the guide arms and in the other direction by the overlapping edge relationships of each shoe with those immediately adjacent. The construction and interfitting relationships of the clutch elements themselves thus insure that the clutch will remain assembled in operation.

Advantages

A primary advantage of the clutch of the present invention is the elimination of separate means for maintaining the component parts of the clutch in their assembled positions. Not only is the present clutch more easily assembled than those of the prior art, the inventory of repair parts is reduced, not only by the elimination of the separate assembly insuring means, but also by the interchangeability of the sectorial shoes. Moreover, there are no critical axial adjustments to be made; the only element necessarily secured to the shaft is the hub. The radially inwardly biasing spring and the guide arms of the hub perform dual functions, the additional function being that of maintaining the component parts of the clutch in their assembled relation to each other. The alternative disposition of the shoes in the first embodiment and the cutting of the grooves and guide arm receiving slots into alternative forward and rearward surfaces of the latter described embodiment contributes materially to the balance and performance of the clutch.

The opening of the spring receiving groove into both faces of each of the sectorial clutch shoes has a further advantage in that cooling air flow may be encouraged both axially through the shoes and circumferentially along the groove. Not only may the friction heat of clutch operation be dissipated to reduce warpage and to otherwise increase clutch shoe life, but the life of the spring may also be extended.

Scope of the invention

The invention may be embodied in specific forms other than those illustrated without departing from the spirit or essential characteristics thereof. For example, the size and number of guide arms and sectorial shoes may be modified as may other means for inwardly biasing the shoes be substituted for the coil spring illustrated.

What is claimed is:
1. A centrifugal friction clutch comprising:
   a driving shaft;
   a hub affixed to said shaft for rotation therewith, said hub having an even number of outwardly extending guide arms which lie in a plane normal to the axis of said hub;
   an even number of sectorial clutch shoes,
   each of said shoes having a groove coaxial with the axis of said hub at a common distance therefrom, said groove extending axially from a side of each of said shoes to a point intermediate the axial thickness thereof,
   each of said shoes having a guide slot extending outwardly from the inner circumference and axially from one side to a point intermediate the axial thickness thereof, each of said slots receiving one of said guide arms so that the leading faces of said arms drivingly engage the leading faces of said slots, said guide arms restraining axial movement of said shoes in one direction,
   each of said shoes having an axial variation in thickness at its leading and trailing edge for overlapping the edges of the immediately adjacent one of said shoes on the side opposite to said slot to restrain axial movement of said shoes in the other direction,
   adjacent of said shoes being reversed with respect to axial orientation of said slots whereby said overlapping edges and said arms restrain axial movement of adjacent ones of said shoes in opposite directions;
   resilient means disposed in said coaxial groove for urging said shoes radially inward about said hub; and
   a driven member comprising a cylindrical drum surrounding said shoes in position to be frictionally engaged by the outer circumference of said shoes as moved outwardly on said guide arms by centrifugal force upon driving rotation of said shaft.

2. The clutch of claim 1 wherein said groove extends axially inward from the opposite side of said shoes from that from which said slot extends.

3. The clutch of claim 2 wherein the axial depth of each of said slots is substantially equal to the axial depth of said groove and the axial thickness of said arms is less than the depth of said slots and of said groove whereby said resilient means and said arms are substantially coplanar.

4. A centrifugal friction clutch comprising:
   a driving shaft;
   a hub affixed to said shaft for rotation therewith, said hub having a plurality of outwardly extending guide arms which lie in a plane normal to the axis of said hub;
   a plurality of sectorial clutch shoes,
   each of said shoes having a groove coaxial with the axis of said hub of a common distance therefrom, said groove being contiguous and extending axially in one portion of each of said shoes from one side thereof to a point intermediate the axial thickness thereof and extending axially in another portion of each of said shoes from the other side to a point intermediate the axial thickness thereof,
   each of said shoes having an axial variation in thickness at its leading and trailing edges for being overlapped on opposite sides at opposite edges by the overlapping axial variation in thickness of the edges of the immediately adjacent ones of said shoes, resilient means disposed in said coaxial groove for urging said shoes radially inward about said hub and cooperating with said overlapped edges to restrain axial movement of said shoes, each of said shoes having a guide slot extending outwardly from the inner circumference, each of said slots receiving one of said guide arms so that the leading faces of said arms drivingly engage the leading faces of said slots, and a driven member comprising a cylindrical drum surrounding said shoes in position to be frictionally engaged on the outer circumference of said shoes when moved outwardly on said guide arms by centrifugal force upon driving rotation of said shaft.

5. The clutch of claim 4 wherein said portions are substantially mutually exclusive and wherein the axial extensions of said groove from opposite sides of said shoes are of sufficient depth for said resilient means to be disposed in substantially a single axial plane.

6. A centrifugal friction clutch comprising:
a driving shaft;
a hub affixed to said shaft for rotation therewith, said hub having an even number of outwardly extending guide arms which lie in a plane normal to the axis of said hub;
an even number of sectorial clutch shoes, each of said shoes having a groove coaxial with the axis of said hub at a common distance therefrom, said groove extending axially from one side of each of said shoes to a point intermediate the axial thickness thereof;
resilient means disposed in said coaxial groove for urging said shoes radially inward about said hub and restraining axial movement of each of said shoes in one direction;
each of said shoes having a guide slot extending outwardly from the inner circumference and axially from the other side to a point intermediate the axial thickness thereof;
each of said slots receiving one of said guide arms so that the leading faces of one of said arms drivingly engage the leading faces of each of said slots, said guide arms restraining axial movement of said shoes in the other direction;
adjacent of said shoes being reversed with respect to axial orientation of said groove and said slots whereby said resilient means and said arms restrain axial movement of adjacent ones of said shoes in opposite directions; and
a driven member comprising a cylindrical drum surrounding said shoes in position to be frictionally engaged by the outer circumference of said shoes as moved outwardly on said guide arms by centrifugal force upon driving rotation of said shaft;
the axial depth of each of said slots being substantially equal to the axial depth of said groove;
the axial thickness of said arms being less than the depth of said slots and of said groove;
said arms and said resilient means being substantially coplanar; and
each of said shoes having an axial variation in thickness at its leading and trailing edge for overlapping the edges of the immediately adjacent one of said shoes.

7. A centrifugal friction clutch comprising:
a driving shaft;
a hub affixed to said shaft for rotation therewith, said hub having an even number of outwardly extending guide arms which lie in a plane normal to the axis of said hub;
an even number of sectorial clutch shoes, each of said shoes having a groove coaxial with the axis of said hub at a common distance therefrom, said groove extending axially from one side of each of said shoes to a point intermediate the axial thickness thereof;

resilient means disposed in said coaxial groove for urging said shoes radially inward about said hub and restraining axial movement of each of said shoes in one direction;

each of said shoes having a guide slot extending outwardly from the inner circumference and axially from the other side to a point intermediate the axial thickness thereof;

each of said slots receiving one of said guide arms so that the leading faces of one of said arms drivingly engage the leading faces of each of said slots, said guide arms restraining axial movement of said shoes in the other direction;

adjacent of said shoes being reversed with respect to axial orientation of said groove and said slots whereby said resilient means and said arms restrain axial movement of adjacent ones of said shoes in opposite directions; and a driven member comprising a cylindrical drum surrounding said shoes in position to be frictionally engaged by the outer circumference of said shoes as moved outwardly on said guide arms by centrifugal force upon driving rotation of said shaft;

the edges of each of said shoes having an axial variation in thickness at its leading and trailing edge for overlapping the edges of the immediately adjacent one of said shoes on the same side of each of said shoes as said slot.

8. A centrifugal friction clutch comprising:
a driving shaft;
a hub affixed to said shaft for rotation therewith, said hub having a plurality of outwardly extending guide arms which lie in a plane normal to the axis of said hub;
a plurality of sectorial clutch shoes, each of said shoes having a guide slot extending outwardly from the inner circumference to a point intermediate the radial thickness thereof;
each of said slots being at least partially axially enclosed by said shoes and receiving one of said guide arms so that the leading faces of said arms drivingly engage the leading faces of said slots and so that contact of said guide arms with the internal axial surfaces of said slots restrains axial movement of said shoes in both directions;
resilient means urging said shoes radially inward about said hub; and
a driven member comprising a cylindrical drum surrounding said shoes in position to be frictionally engaged by the outer circumference of said shoes when moved outwardly on said guide arms by centrifugal force upon driving rotation of said shaft;
each of said shoes having an axial variation in thickness at its leading and trailing edge for being overlapped on opposite sides at opposite edges by the overlapping axial variation in thickness of the edges of the immediately adjacent ones of said shoes whereby axial movement of each of said shoes is additionally restrained;
each of said shoes having a groove substantially coaxial with and spaced from the axis of said hub, with said groove being continuous and said resilient means being disposed in said groove; and
each said groove extending axially in a portion of its associated shoe from one side to a point intermediate the axial thickness thereof and extending axially in another portion of its associated shoe from the other side to a point intermediate the axial thickness thereof, with said portions being substantially mutually exclusive.

9. A centrifugal friction clutch comprising:
a driving shaft;
a hub affixed to said shaft for rotation therewith, said hub having a plurality of outwardly extending guide arms which lie in a plane normal to the axis of said hub;

a plurality of sectorial clutch shoes, each of said shoes having a guide slot extending outwardly from the inner circumference to a point intermediate the radial thickness thereof;

each of said slots being at least partially axially enclosed by said shoes and receiving one of said guide arms so that the leading faces of said arms drivingly engage the leading faces of said slots and so that contact of said guide arms with the internal axial surfaces of said slots restrains axial movement of said shoes in both directions;

resilient means urging said shoes radially inward about said hub; and a driven member comprising a cylindrical drum surrounding said shoes in position to be frictionally engaged by the outer circumference of said shoes when moved outwardly on said guide arms by centrifugal force upon driving rotation of said shaft;

each of said shoes having a groove substantially coaxial with and spaced from the axis of said hub, with said groove being continuous and said resilient means being disposed in said groove; and each said groove extending axially in a portion of its associated shoe from one side to a point intermediate the axial thickness thereof and extending axially in another portion of its associated shoe from the other side to a point intermediate the axial thickness thereof, with said portions being substantially mutually exclusive.

10. A centrifugal friction clutch comprising:

a driving shaft;

a hub affixed to said shaft for rotation therewith, said hub having a plurality of circumferentially spaced outwardly extending guide arms which lie in a plane normal to the axis of said hub;

a plurality of sectorial clutch shoes assembled on said hub;

each of said shoes having a guide slot extending outwardly from the inner circumference thereof for receiving one of said hub guide arms so that the leading face of one of said arms drivingly engages the leading face of a slot in each of said shoes;

said assembled shoes collectively having a continuous, resilient means receiving groove, said groove opening alternatively into the forward and rearward sides of said assembled shoes over substantially equal circumferential arcs;

resilient means disposed in said groove for urging said shoes radially inward about said hub; and a driven member comprising a cylindrical drum surrounding said shoes in position to be frictionally engaged by the outer circumference of said shoes as moved outwardly on said guide arms by centrifugal force upon driving rotation of said shaft;

said groove opening alternatively into forward and rearward sides of each of said shoes over substantially equal circumferential arcs.

11. The clutch of claim 10 wherein said overlapping edges lie on the same side of each of said shoes as said slot.

12. In a centrifugal friction clutch including:

a hub operable to be connected with a drive shaft for rotation about an axis;

a plurality of circumferentially spaced guide arms which project generally outwardly of said hub;

a plurality of sectorial clutch shoes assembled on said hub;

each of said shoes having a guide slot extending generally outwardly of said hub and operable to receive one of said guide arms; and clutch drum means generally circumferentially encircling said shoes, and operable to be frictionally engaged by the outer circumferences of said shoes as said shoes move outwardly on said guide arms in response to centrifugal force action on said shoes;

the improvement comprising:

a groove in each of said shoes extending generally and partially about the axis of rotation of said hub, said groove including at least a portion extending generally axially from at least one side of said shoe relative to said hub to a location generally intermediate the axial thickness thereof;

said grooves of said shoes cooperating to provide a series of circumferentially alternating, oppositely axially facing shoe openings with there being some circumferentially spaced openings on each side of said shoe assembly;

spring means disposed in said grooves of said shoe assembly and operable to urge said shoes generally inwardly toward said hub;

said shoes including circumferentially spaced, spring retaining wall means on each side of said shoe assembly, with said wall means being displaced generally axially of said spring means and defining closed, side portions of said grooves; and each of said shoes having generally circumferentially extending, leading and trailing, stabilizing portions with each such stabilizing portion circumferentially overlapping a portion of an adjacent shoe of said assembly.

13. A centrifugal clutch as described in claim 12 wherein each groove in each clutch shoe includes:

a circumferentially extending, first portion facing axially in one direction; and a circumferentially extending second portion circumferentially offset from said first portion and facing axially in a direction opposite to one direction; and each guide slot of each clutch shoe includes:

a first portion facing axially in one direction; and a second portion circumferentially offset from said first portion and facing axially in a direction opposite to said one direction.

14. A centrifugal clutch as described in claim 12 wherein:

each stabilizing portion of each clutch shoe is generally axially aligned on one side thereof; and said clutch shoes are circumferentially arranged with adjacent shoes facing in generally opposite axial directions.

15. A centrifugal clutch as described in claim 12 wherein said stabilizing portions are axially displaced and located in general alignment with opposite sides of their respectively associated clutch shoes.

References Cited

UNITED STATES PATENTS

| 1,650,201 | 11/1927 | Elling et al. |
| 2,016,643 | 10/1935 | Lowndes. |
| 2,564,826 | 8/1951 | Yoder. |
| 2,730,219 | 1/1956 | Kitto. |
| 2,809,535 | 10/1957 | Hein et al. |
| 2,947,399 | 8/1960 | Moore et al. |
| 3,367,464 | 2/1968 | Fullerton et al. |

BENJAMIN W. WYCHE III, Primary Examiner

U.S. Cl. X.R.

188—185; 192—113